United States Patent
Acampora et al.

[11] Patent Number: 5,847,779
[45] Date of Patent: Dec. 8, 1998

[54] SYNCHRONIZING A PACKETIZED DIGITAL DATASTREAM TO AN OUTPUT PROCESSOR IN A TELEVISION SIGNAL PROCESSING SYSTEM

[75] Inventors: Alfonse Anthony Acampora, Staten Island, N.Y.; Richard Michael Bunting, Hamilton Square; Paul Wallace Lyons, New Egypt, both of N.J.

[73] Assignee: RCA Thomson Licensing Corporation, Princeton, N.J.

[21] Appl. No.: 750,403
[22] PCT Filed: Jun. 15, 1994
[86] PCT No.: PCT/US94/06803
§ 371 Date: Dec. 6, 1996
§ 102(e) Date: Dec. 6, 1996
[87] PCT Pub. No.: WO95/34990
PCT Pub. Date: Dec. 21, 1995

[51] Int. Cl.[6] .................................................. H04N 7/64
[52] U.S. Cl. ..................... 348/845.3; 348/500; 375/357
[58] Field of Search .................... 348/845.3, 845.1, 348/845.2, 845, 500, 516, 521, 522, 524, 525, 423; 375/357, 369–370, 372; 370/503, 507

[56] References Cited

U.S. PATENT DOCUMENTS

| | | |
|---|---|---|
| 4,949,175 | 8/1990 | Wind .................................. 348/472 |
| 5,038,347 | 8/1991 | Courtois ............................. 370/440 |
| 5,168,356 | 12/1992 | Acampora et al. .................. 348/409 |
| 5,231,486 | 7/1993 | Acampora et al. .................. 348/390 |
| 5,287,178 | 2/1994 | Acampora et al. .................. 348/384 |
| 5,381,181 | 1/1995 | Deiss .................................... 348/423 |
| 5,565,923 | 10/1996 | Zdepski ............................... 348/423 |
| 5,566,174 | 10/1996 | Sato et al. ............................ 348/423 |
| 5,602,595 | 2/1997 | Citta et al. ........................... 348/423 |
| 5,703,887 | 12/1997 | Heegard et al. ...................... 371/42 |
| 5,767,912 | 6/1998 | Bunting et al. ..................... 348/426 |

*Primary Examiner*—Tommy P. Chin
*Assistant Examiner*—Vu Le
*Attorney, Agent, or Firm*—Joseph S. Tripoli; Eric P. Herrmann; Ronald H. Kurdyla

[57] ABSTRACT

A system of the present invention addresses the difficulty of aligning a reference sync byte at the beginning of a data packet during situations where the system experiences severe problems such as arbitrary resets/restarts or transmission disturbances. Specifically, the sync byte at the beginning of the data packet is automatically aligned with the beginning of a data acquisition interval when data is requested, even when there are arbitrary system resets/restarts. The alignment of the first data packet following a system reset is facilitated by the use of a Start Of Packet flag concurrent with the reference byte, together with a controlled logic network.

16 Claims, 5 Drawing Sheets

५,८४७,७७९

SYNCHRONIZING A PACKETIZED DIGITAL DATASTREAM TO AN OUTPUT PROCESSOR IN A TELEVISION SIGNAL PROCESSING SYSTEM

BACKGROUND OF THE INVENTION

This invention is related to the field of digital video signal processing, and more particularly to a system for maintaining packet alignment in a packetized data system suitable for use in a high definition television system.

Recent developments in the field of video signal processing and transmission include systems for digital high definition television processing and transmission. One such system is described in U.S. Pat. No. 5,168,356-Acampora et al. In that system, a codeword datastream, including codewords provided in accordance with the MPEG-2 data compression standard as is known, are conveyed to a transport processor. A major function of the transport processor is to pack variable length codeword data into packed data words. An accumulation of packed data words, called a data packet or data cell, is prefaced by a header which contains information for identifying the associated data words, among other information. Thus an output from the transport processor is a packetized datastream comprising a sequence of transport packets. The transport packet format enhances the prospects of resynchronization and signal recovery at a receiver, eg., after a signal disruption which may result from a transmission channel disturbance, by providing header data from which a receiver can determine re-entry points into the datastream upon the occurrence of a loss or corruption of transmitted data.

At the encoder/transmitter end of a system employing a packetized datastream format, an output modulator typically extracts data packets from a preceding encoder (transport processor) and processes this data in accordance with the requirements of the particular system. For example, processing by the modulator may include a variety of functions including error correction processing by appending Forward Error Correction (FEC) bytes to the packet boundaries, byte interleaving to protect against burst errors in the transmission medium, trellis (or other) coding for robustness, spectral shaping, and interleaving a resulting symbol datastream for additional burst error protection.

The modulator may operate in two ways for performing these functions. The modulator may acquire (request) data from the transport encoder packet by packet at a constant rate, or it may acquire packet data with variable length pauses between the acquisition of packets, with the variable length of each pause being a function of the time needed to accomplish the described processes. In the first case, the modulator must provide large data buffers to accomodate the data rate conversions during FEC and symbol creation, for example. These buffers must also be provided at a receiver demodulator. The latter variable pause technique is preferred because the large buffers are not required, and the start-stop nature of the processing is easily accomodated by existing compression and transport encoder networks without requiring additional hardware.

The modulator is the controlling element in the preferred variable pause system. In such case the modulator enables the transport datastream for receiving exactly one data packet, which is 188 bytes in the case of a system according to the MPEG-2 compression standard as is known. The data flow is inhibited to allow the FEC and other processes described above to be performed. To properly process the datastream packets in a system employing the MPEG-2 compression standard, for example, the first data received by the modulator in response to the data packet enable signal must be the sync byte since the sync byte denotes the start of a packet.

SUMMARY OF THE INVENTION

It is herein recognized that alignment of the start of a packet with the first byte interval of a modulator data enable signal which request data from the transport encoder is difficult without incorporating complicated interfaces with multi-level protocols. It is furthermore recognized that, even with such complicated interfaces, severe problems may occur when, for example, the system experiences a reset condition associated with energizing the system or a system perturbation. If the transport encoder has data available as it is brought back on-line during a modulator data enable interval, such condition may result in an unrecoverable offset between the start of a data packet and subsequent beginnings of the modulator enable signal from that point on, resulting in faulty data processing.

A system in accordance with the principles of the present invention addresses this problem by assuring that a reference byte (eg., a sync byte) at the beginning of a data packet is automatically aligned with the beginning of a data acquisition interval when data is requested from a preceding encoder, even when there are arbitrary system resets/restarts. In an illustrated embodiment, alignment by the first data packet following a system reset is facilitated by the use of a Start Of Packet flag concurrent with the reference byte, together with a controlled logic network.

DETAILED DESCRIPTION OF THE DRAWING

Figure 1:
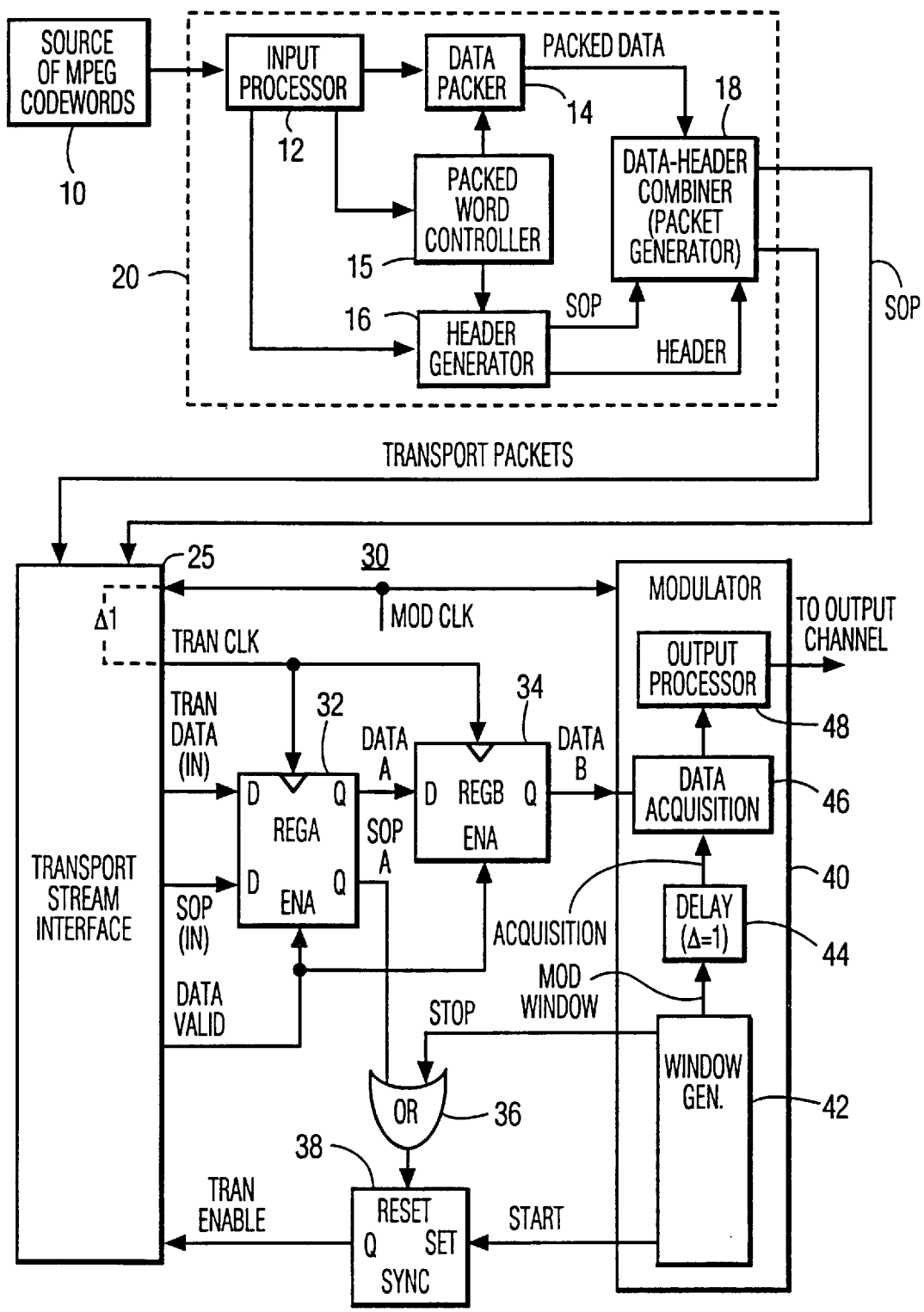
FIG. 1 is a block diagram of a portion of a video signal processor and encoder including apparatus according to the present invention.

In FIG. 1, variable length compressed codewords according to the MPEG-2 Draft International Standard ISO-IEC 13818-2, May 10, 1994 standard are provided by a video signal processing source 10 to an input processor 12 of a transport processor/encoder 20. A major function of transport processor 20 is to pack the codewords into fixed length data words that are eventually formed into fixed length (188 byte) data packets, each of which is prefaced by a header. Input processor 12 provides variable length codewords to a data packer 14, and control signals and flags to a controller 15 and to a header generator 16. For example, controller 15 monitors the accumulation of word length data from input processor 12 to ascertain the completion of fixed length data words, and sends appropriate word address and word control signals to data packer 14. The word addresses insure proper concatenation of the variable length codewords. The word control signals account for short words and provide marking and alignment flags as needed. Codeword source 10 may incorporate data packer 14 and controller 15. In such case, multiple sources of packed data can be directly multiplexed to the input of data/header combiner 18. Suitable headers denoting program source, service type and other information relating to the payload data is provided by header generator 16.

Packed data from packer 14 is conveyed to a data-header combiner 18, ie., a packet generator, which also receives data write and enable signals from packer 14 that enable valid data to be written to input FIFO buffers in packet generator 18. Packed data words are transmitted to packet generator 18 whenever the packed data words are available. Similarly, transport headers are transmitted from header generator 16 to an input FIFO buffer of packet generator 18 whenever the headers are available. Information used by header generator 16 to form headers is obtained from input processor 12 and from controller 15. Header generator 16 also provides write enable output signals to packet generator 18 to indicate that a header is ready and to enable the headers to be written to the input FIFO. Each header contains information related to the data in the packet with which the header is associated. The header information aids synchronization, program identification, de-scrambling control, demultiplexing, path routing, payload type at a receiver, and in this example includes an MPEG-2 sync byte in the first header interval. It is noted that header generator 16 also generates a Start Of Packet (SOP) flag coincident and in parallel with the sync byte, which in this system occurs at the start of a packet. Packet generator 18 prefaces each packed data payload with an appropriate header, and forwards the resulting transport packet and paralleled SOP flag to a transport stream interface unit 25 as will be discussed.

Transport packets and SOP flags from transport processor 20 are conveyed by interface unit 25 and a logic circuit 30 to a modulator 40. Modulator 40 includes an output processing and modulation unit 48 that performs various signal processing functions on packetized data before the packetized data is configured for transmission to an output channel such as a satellite, cable or terrestrial broadcast channel. In this regard output unit 48 may include FEC, interleaving, coding, spectral shaping and modulation networks including Quadrature Amplitude (QAM) or Vestigial Sideband (VSB) modulation networks, for example. The data packets processed by unit 48 are acquired by means of elements 42, 44 and 46 associated with modulator 40 in cooperation with logic circuit 30 and interface 25. These elements cooperate to assure that the first data entry of an acquisition window interval is the MPEG-2 sync byte denoting the start of a packet. Since the modulator is the controlling factor, the start of a packet must reach the point of origin of the Acquisition signal (internal to the modulator) coincident with the first byte interval issuance of this signal. In particular, these elements cooperate to assure that the MPEG-2 sync byte at the beginning of each data packet is automatically aligned with the beginning of a data acquisition interval when modulator 40 requests/extracts a transport packet for processing, even in the presence of disruptive conditions such as arbitrary system resets. As will now be discussed, such alignment is achieved quickly after a disruptive condition such as a system reset, or a clock slip or phase jump perturbation, and in the present example is facilitated by the use of the Start Of Packet (SOP) flag concurrent with the sync byte.

Figure 2:
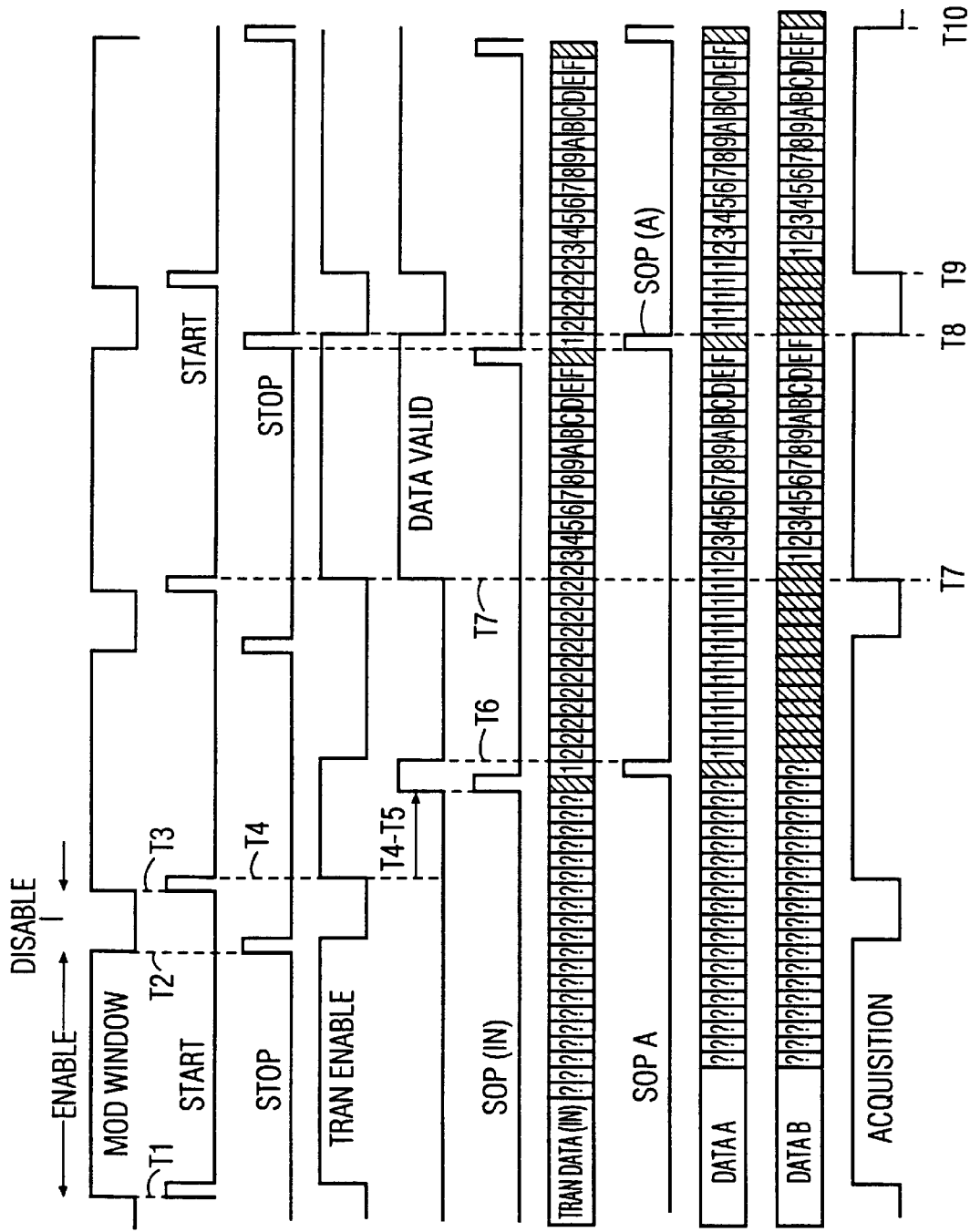
FIG. 2 is a timing diagram for signals associated with the operation of the system shown in FIG. 1.

The following discussion of the operation of the system in FIG. 1 is made with reference to the signal timing diagrams of FIG. 2. A window signal generator 42 in modulator 40 generates a Modulator (Mod) Window signal including an Enable interval and a shorter duration Disable interval. The Enable interval represents a period of time when the modulator seeks to acquire a data packet for processing. The Disable interval represents that period of time when the modulator is processing an acquired packet to provide FEC, interleaving, coding etc. as mentioned previously. The length of each Disable interval is a function of the time required for modulator 40 to process a given packet. Although the processing time will typically be a prescribed fixed length, the modulator may send transmitter-specific information, such as equalization training, for which the transmission of packetized data may be disabled. However, the synchronization system described will function even in the specialized case where the disable interval between packets is of arbitrary duration. In this example the Disable intervals are shown to have a fixed length in the interest of simplicity and to facilitate a clear understanding of the following discussion of the timing relationships among the illustrated signals.

In association with the Mod Window signal, generator 42 also produces Start and Stop timing signals each comprising a series of positive pulses with a duration of one clock cycle. The leading edge of a Start pulse is coincident with the beginning of an Enable interval, and the leading edge of a Stop pulse is coincident with the end of an Enable interval. The Mod Window signal is delayed one clock cycle by a unit 44 to produce an Acquisition signal, which is shown at the bottom of FIG. 2. This signal controls the operation of a data acquisition unit 46 which acquires data packets (Data B, as will be discussed) during an acquisition interval and conveys acquired data packets to modulator 48 for processing. The Acquisition signal is identical to the Mod Window signal except that it is delayed one clock relative to the Mod Window signal. The Mod Window signal, the Acquisition signal, and the Stop and Start signals are free-running and are not subject to start-stop operation.

In FIG. 2, a signal designated as Tran Data (In) corresponds to a packetized datastream signal appearing at an output of interface 25 in response to the input transport packet datastream applied to interface 25. The operation of the FIG. 1 system will first be described in the context of a situation where an arbitrary perturbation has occurred, causing a system reset at transport processor 20. In such a case, as is typical, output buffers associated with packet generator 18 are "flushed" whereby the buffers are emptied. This condition is illustrated by the first 20 bytes of the Tran Data (In) signal of FIG. 2, which contain the symbol "?". In this example a valid data packet to be acquired by units 46 and 48 for processing is defined by 16 byte intervals (123456789ABCDEF) including a sync byte interval at the start of the packet. The sync byte interval of each packet is highlighted by shading. The SOP (In) flags generated by the transport processor depicted in FIG. 2 directly above the Tran Data (In) signal, concurrent with the sync byte interval.

A Transport Enable (Tran Enable) signal is produced by a Set-Reset flip-flop 38 in network 30 in response to the leading edge of each Start pulse from generator 42, which sets flip-flop 38 so that the Tran Enable signal begins one clock after the Start pulse. The Tran Enable signal normally is time-aligned with the Acquisition signal and similarly defines packet acquisition intervals.

In the following sequence of events, time intervals T1–T2 and T2–T3 define nominal enable and disable intervals of the free-running Mod Window signal, respectively. Under normal conditions, a Tran Enable interval begins at time T4, after a Start pulse, indicating that modulator 40 is seeking to acquire a packet for processing. At this time, however, no packet data is available because of the (assumed) arbitrary and disruptive reset condition which has emptied the preceding FIFO buffers. This lack of packet data is indicated by a low logic level of a Data Valid signal, the origin of which will be explained in connection with FIG. 3. Since the Data Valid signal is low, the modulator continuously acquires the data held in register 34 (or register 55 in FIG. 4) during acquisition interval T4–T5, and for all times prior to this interval when the acquisition window signal is high and the Data Valid signal is low. This is a normal start-up phenomenon.

A positive-going Data Valid signal appears at time T5, indicating the appearance of the first valid data in the form of the sync byte of the Tran Data (In) signal (shaded area). The positive Data Valid signal is generated by a logic circuit (FIG. 3) responsive to the presence of the Tran Enable signal indicating that packet data is being sought, and a "Buffer Fullness" Flag indicating that data is present in a preceding buffer (in the form of the sync byte). The appearance of the SOP (IN) flag at time T5, concurrent with the re-appearance of a valid sync byte in the datastream, begins a realignment process that properly aligns the beginning of forthcoming data packets with the acquisition intervals of the Acquisition signal.

With reference to circuit 30 of FIG. 1, the packet alignment process begins by the SOP flag from interface 25 transiting register 32 (a "D" flip-flop) to appear one clock delayed as SOP A at a "Q" output of register 32. The SOP A flag resets flip-flop 38 via logic OR gate 36, causing the positive Trans Enable signal to return to a low logic level at time T6. This reset action disables an output register of interface 25 (as will be seen from FIG. 3), whereby passage of data ceases, although the Mod Window signal continues unaffected. The cessation of data flow is reflected in the Data Valid signal. The Data Valid signal, which is a function on the Trans Enable signal level, is truncated and returns to a low logic level at the same time. The resetting of flip-flop 38 by the SOP flag results in the next Stop pulse having no effect.

Figure 3:
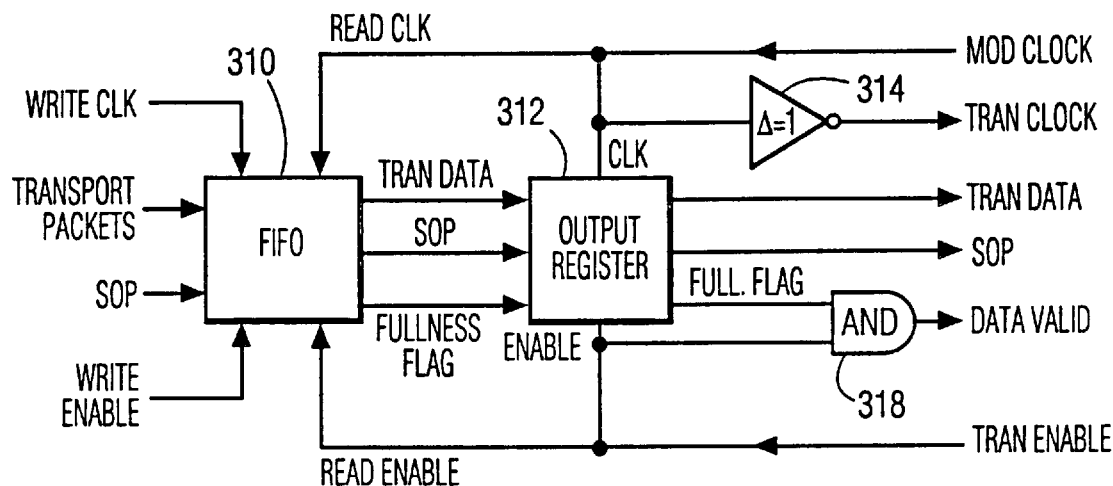
FIG. 3 shows details of a portion of the apparatus of FIG. 1.

Output register 312 in FIG. 3, and registers 32 and 34 in FIG. 1, hold successive data words. These registers thus form a pipeline structure and operate in a shift register fashion. To stop the shift process requires that all register stages be simultaneously disabled.

Register 32 and a similar cascaded unit 34 are clocked by a signal Tran Clk that is an inverted version of a clock Mod Clk applied to modulator 40. The data inputs of registers 32 and 34 are enabled by the positive Data Valid signal. Since the positive Data Valid signal is inhibited by the resetting action of the SOP A flag at time T6, registers 32 and 34 are then unable to respond to input data. Consequently, the respective register outputs repeatedly hold the last data byte that was read in. In the case of register 32, the repeated output data is data from the first datastream byte interval ("1") following the sync byte interval, as indicated by the Data A signal in FIG. 2. In the case of register 34, the repeated output data is sync byte interval data, as indicated by the Data B output signal in FIG. 2.

The very next Start pulse "sets" flip-flop 38, whereby a positive Tran Enable component begins at time T7, aligned with the falling edge of the Start pulse. It is noted that when flip-flop 38 is set to resume normal operation at this time, the sync byte of Data B (which was "stuck" at the output of register 34) is the first byte that appears in the enable interval of the Mod Window signal beginning at time T7. A positive Data Valid signal begins at the same time, enabling registers 32 and 34 to convey data from input to output as indicated by the Data A and Data B signals in FIG. 2. Since the positive Tran Enable and Data Valid signal components are aligned with the acquisition intervals of the Acquisition signal (eg., T7–T8 and T9–T10), each acquisition interval properly contains a complete data packet comprising a sync byte followed by 15 data bytes. All subsequent SOP A pulses will be aligned (coincident) with a Stop pulse as shown, unless a system perturbation occurs, after which the acquisition of data will be automatically re-aligned by the independent resetting action of the SOP flags as discussed.

Thus it is seen that the described system advantageously achieves proper alignment of a packet within a packet acquisition interval immediately after an arbitrary system fault or reset/restart. In particular, the packet sync byte properly appears at the beginning of the packet acquisition interval with minimal disruptive offset in the packet datastream. Several examples are of interest in this regard. A first case is where a packet longer than the fixed 188 byte length is erroneously placed in the datastream. The Stop signal will reset flip-flop 38 in FIG. 1, creating an abnormal packet, eg., a packet where the next packet does not begin with a sync byte because the sync byte remains in FIFO 310 (FIG. 3). When the Start signal causes data flow to resume, the emergence of the sync byte causes the data flow to stop again, as a result of flip-flop 38 being reset. This creates a second abnormal packet, but from this point on, synchronization is achieved. A second case is where a packet with less than 188 bytes is erroneously placed in the datastream. The Start of Packet (SOP) flag will reset flip-flop 38 in FIG. 1, creating an abnormal packet. The subsequent appearance of a Stop pulse is redundant because flip-flop 38 is already reset. A third case is where the Stop signal from the modulator arrives early. Two successive abnormal packets are created, similar to the first case. Also, a case where the Stop signal occurs late is similar to the second case. In all cases, synchronization is automatically restored. In particularly noisy environments, there is merit in disconnecting the Stop signal line to OR gate 36 (thereby eliminating the need for gate 36) and using only the SOP flag to reset flip-flop 38.

Under normal conditions, the system is reset and data passage to modulator 40 is inhibited in response to the appearance of either a positive SOP (A) flag or a positive Stop pulse, which normally are coincident in time. Data passage remains inhibited during the subsequent modulator processing interval between acquisition intervals. Data passage resumes when registers 32 and 34 are again enabled in response to the next Start pulse, which "sets" unit 38 and thereby enables registers 32 and 34 to convey data, giving a properly positioned sync byte as the first data word in the acquisition window, under normal circumstances.

FIG. 3 shows additional details of interface unit 25 in FIG. 1. Transport packets and the SOP flag from transport processor 20 are provided to respective inputs of a FIFO buffer 310. Buffer 310 also receives a Write clock and a Write Enable signal from the transport processor. The Mod clock signal from network 30 (FIG. 1) is applied to a clock input of an output register 312, and the Tran Enable signal from network 30 is applied to an Enable input of output register 312. A Tran Data signal (transport packets) and SOP flag from FIFO 310 are conveyed via register 312 to network 30 of FIG. 1. A Fullness Flag provided by FIFO 310 is programmable to indicate a state of data fullness of FIFO 310, eg., from one to several bytes or packets residing in FIFO 310. The Fullness Flag output from register 312 and the Tran Enable signal from network 30 are provided to a logic AND gate 318 that generates the Data Valid signal when both the Fullness Flag and the Tran Enable signals are present.

The Tran Clock that is provided back to network 30 is derived from the Mod Clock signal after inversion by an inverter 314, which exhibits a delay of less than one clock cycle. When the Mod clock signal and the Tran Enable signal are properly registered with each other as they emanate from the modulator, they will maintain this registration as they appear at FIFO 310 and out register 312 in FIG. 3, even though there is an arbitrary delay (eg., cable and device delay) between the modulator and the transport processor, since both signals traverse the same delay path. The Tran Data signals will have a defined relationship to the Mod clock at the transport output. However, as the Tran Data signal reaches the modulator input, its relationship with the originating Mod clock signal will depend on cable delays, since only Tran Data has traversed the delay path. This problem is resolved by sending a replica of Mod clock, Tran clock, along with Tran Data to assure registration. Preferably an inversion of the Mod clock is sent because this signal is well positioned (nominal centering of the rising edge) with Tran Data. If the delays between the modulator and the transport processor are well defined, then the Tran clock can be eliminated and a delay trimmed version of Mod clock can be used in the modulator.

The occurrence of a positive Data Valid signal indicates that there is data in FIFO 310 (valid or invalid, as indicated by the fullness flag), and that the modulator is requesting data (as indicated by the Tran Enable signal). If FIFO 310 contains invalid data, such data will be conveyed to the modulator during the acquisition interval. In practice, however, this will rarely occur since typically both FIFO 310 and the output buffer of the transport processor will be emptied upon the occurrence of a system perturbation which requires a transport reset, and the first data byte will be a valid sync byte.

Figure 6:
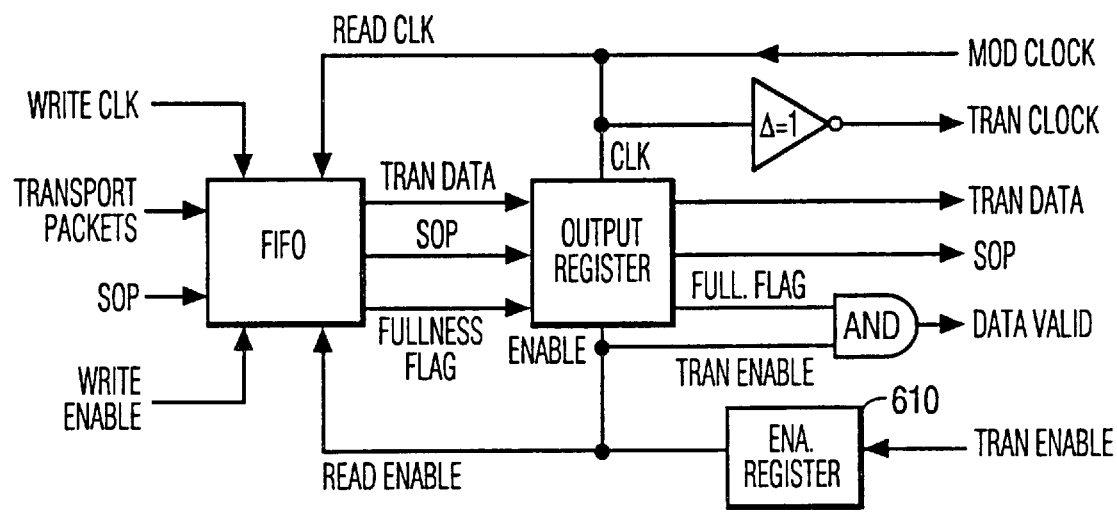
FIG. 6 depicts details of a portion of the apparatus of FIG. 4.
Figure 4:
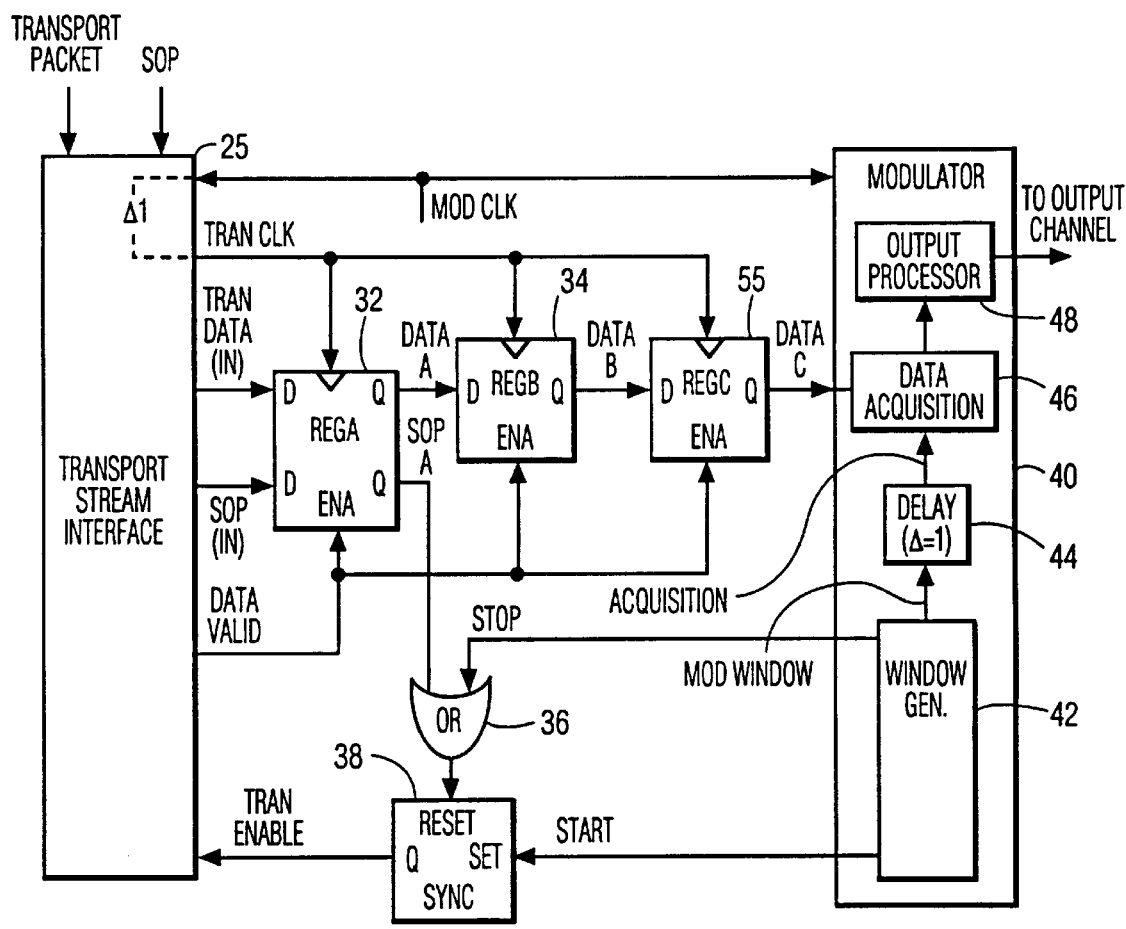
FIG. 4 illustrates an alternative embodiment of apparatus shown in FIG. 1.
Figure 5:
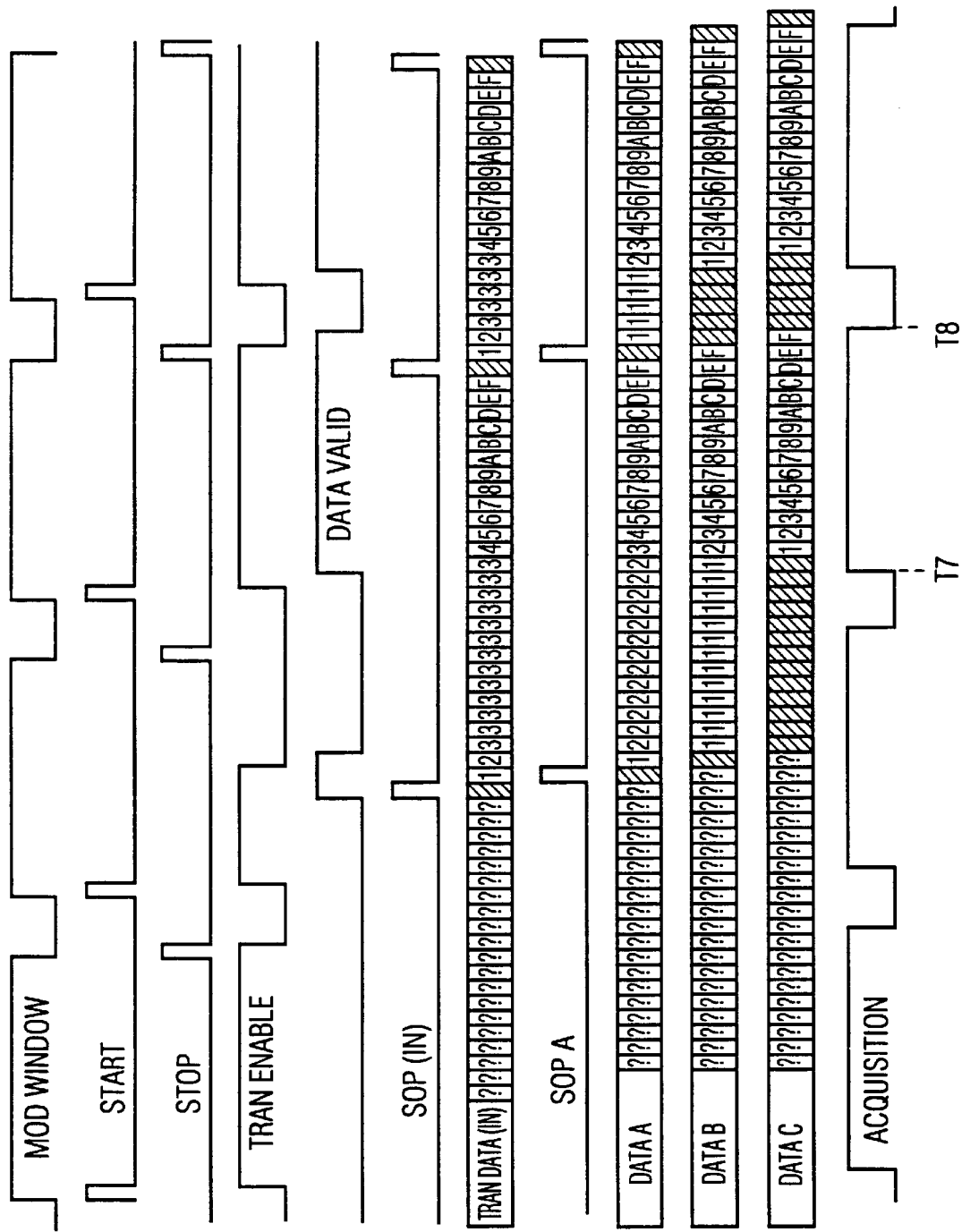
FIG. 5 is a timing diagram for signals associated with the apparatus of FIG. 4.

The apparatus of FIG. 6 is a modified version of the FIG. 3 apparatus. FIG. 6 is similar to FIG. 3 except that an enable register 610 has been added as shown. The use of register 610 provides improved noise immunity, which may be required in the case of a long cable connection between network 30 and transport interface 25. The use of register 610 introduces an additional one clock delay into the system, which delay is compensated for by modifying network 30 as shown in FIG. 4. Network 30 in FIG. 4 is similar to network 30 in FIG. 1 except that a register 55 has been added. Since register 55 introduces an additional one clock delay, the delay produced by element 44 has been increased a corresponding amount to two clock delays. The timing diagram for the system of FIG. 4 is shown in FIG. 5. The system of FIG. 4 is similar to that of FIG. 1 except that data packets from the Data C output of register 55 are acquired for processing during the acquisition intervals, eg., between times T7 and T8 in FIG. 5. The disclosed apparatus may be further modified to include additional registers to compensate for additional delays introduced by elements corresponding to register 610 in FIG. 6, or otherwise.

In an alternative version of the disclosed system, an End of Packet flag could be used instead of a Start of Packet flag as disclosed. In such case the point of detection would move to the output of register 34 in FIGS. 1 and 4. In addition, the sync byte structure (eg., 47 Hex) could be sought in the datastream itself. This may be difficult due to the value of the sync byte not being unique, but achievable given the start/stop (enable/disable) nature of the system operation. The use of time variable disable intervals increases the complexity (eg., programmable counters, varying with each packet cycle, may be needed).

We claim:

1. In a system for processing a packetized digital datastream containing video information, apparatus comprising:

transport processor means (20, 25) responsive to input data (10) for producing data packets;

means (40) for processing said data packets produced by said transport processor means, said processing means acquiring said data packets during acquisition intervals and processing data packets during processing intervals between said acquisition intervals;

means (25, 30, 32, 34) for conveying data packets to said processing means; and synchronizing means (32, 36, 38, 312, 314, 318), coupled to said transport processor means and to said means for processing said data packets, responsive to the condition of a datastream from said transport processor means to facilitate automatic alignment of a reference data component (sync byte) of a data packet with a beginning of each acquisition interval in a normal operating condition of said system, and to facilitate said automatic alignment upon cessation of an abnormal condition wherein a normal datastream from said transport processor means is disrupted.

2. Apparatus according to claim 1 and further comprising means for producing a signal (Fullness Flag) representative of the memory occupancy status of said transport processor means; wherein said synchronizing means responds to said occupancy status signal.

3. Apparatus according to claim 2, wherein said transport processor means is subject to being reset in response to said abnormal condition.

4. Apparatus according to claim 1 further including means providing a signal (SOP) representative of a packet boundary; and means (36, 38, 318) for conditioning operation of said synchronizing means as a function of said boundary representative signal.

5. Apparatus according to claim 1, wherein said data packets include MPEG-2 coded information; and said reference data component is a sync component prefacing a data packet.

6. Apparatus according to claim 1, wherein said acquisition intervals exhibit substantial constant duration; and said processing intervals are subject to exhibiting variable duration.

7. Apparatus according to claim 1, wherein said processing means includes means for performing error correction processing and modulation functions.

8. Apparatus according to claim 1 and further comprising means (16) for generating a flag (SOP) concurrent with said reference data component at the beginning of a data packet.

9. Apparatus according to claim 8, wherein said synchronizing means includes control means (32, 34, 36, 38) responsive to said data packets and to said flag (SOP) for resetting said synchronizing means so as to inhibit passage of data to said processing means during said processing intervals.

10. Apparatus according to claim 9, further including means (42) for providing a periodic Window signal including enable intervals related to said acquisition intervals and intervening disable intervals related to said processing intervals;

means (42) for providing, to said control means, timing signals (Start, Stop) respectively coincident with a beginning of said enable intervals of said Window signal and an end of said enable intervals;

means (44) for providing an Acquisition signal having periodic acquisition intervals related to said enable intervals of said Window signal and corresponding to said acquisition intervals of said processing means, for controlling the acquisition of data to be processed by said processor; and means (38) for providing, to said control means, an Enable signal including a data enable interval (Tran Enable) and intervening intervals normally respectively related to said enable and disable intervals of said Window signal, said Enable signal exhibiting first and second states respectively associated with passing and inhibiting of data in response to said flag.

11. Apparatus according to claim 1, wherein said reference data component is a sync component;

said transport means produces alignment flags concurrent with respective ones of said sync components in addition to said data packets; and said conveying means is inhibited to prevent passage of data to said processor means in response to said alignment flags.

12. Apparatus according to claim 11, wherein said synchronizing means includes storage means (32, 34) inhibited (via 36, 38, ENA input) to prevent passage of data to said processor means in response to said alignment flags.

13. Apparatus according to claim 1, comprising means for providing a first clock signal (Mod clock) to said processing means and to said transport means (25, 310, 312);

means for transmitting a replica (Tran Clock) of said first clock signal together with data (Tran Data) from said transport means to said conveying means.

14. Apparatus according to claim 1, comprising means for providing a first clock signal (Mod clock) to said processing means and to said transport means (25, 310, 312);

means (314) associated with said transport means for deriving a second clock signal (Tran clock) from said first clock signal; and means for providing said second clock signal to a clock input of said conveying means.

15. Apparatus according to claim 14, wherein said second clock signal is an inverted version of said first clock signal.

16. In a system for processing a packetized digital datastream containing video information, apparatus comprising:

transport processor means (20, 25) responsive to input data (10) for producing data packets, said transport processor means subject to being unpredictably reset whereby a datastream of data packets from said transport processor means is disrupted;

means (40) for processing said data packets produced by said transport processor means, said processing means acquiring said data packets during acquisition intervals and processing data packets during processing intervals between said acquisition intervals;

means (25, 30) for conveying data packets to said processing means; and synchronizing means (32, 36, 38, 312, 314, 318), coupled to said transport processor means and to said means for processing said data packets, for automatically aligning a beginning of an acquisition interval and a reference data component (sync byte) of a data packet appearing after resets of said transport processor means.

* * * * *